United States Patent [19]

Stone

[11] 4,029,343
[45] June 14, 1977

[54] EXPANSION JOINT FOR PREFABRICATED DOUBLE-WALLED METAL CHIMNEY

[75] Inventor: Richard L. Stone, Los Altos Hills, Calif.

[73] Assignee: Wallace-Murray Corporation, Belmont, Calif.

[22] Filed: Sept. 23, 1976

[21] Appl. No.: 725,873

[52] U.S. Cl. .......................... 285/47; 285/133 R; 285/302; 285/373

[51] Int. Cl.² .......................................... F16L 39/00

[58] Field of Search ............ 285/47, 133 R, 133 A, 285/424, 302, 367, 373, 419, DIG. 5, 187; 138/148, 149

[56] References Cited

UNITED STATES PATENTS

| 1,824,422 | 9/1931 | Badger ............................ 285/302 |
| 2,850,264 | 9/1958 | Grable ........................... 285/133 A |
| 3,208,539 | 9/1965 | Henderson ................ 285/133 A X |
| 3,427,051 | 2/1969 | White et al. .................... 285/302 X |
| 3,544,135 | 12/1970 | Hoerrner ............................ 285/47 |
| 3,583,730 | 6/1971 | Kozlowski ........................... 285/47 |
| 3,902,744 | 9/1975 | Stone .............................. 285/373 X |

Primary Examiner—Thomas F. Callaghan
Attorney, Agent, or Firm—Owen, Wickersham & Erickson

[57] ABSTRACT

An expansion and length adjustment joint for a prefabricated double-walled metal chimney is disclosed. The joint provides for easy installation of the chimney at a job site without cutting of chimney sections. To prevent escape of flue gases, at least one gasket is positioned on one inner wall member for sliding engagement against the other inner wall member.

7 Claims, 4 Drawing Figures

U.S. Patent  June 14, 1977  Sheet 1 of 2  4,029,343
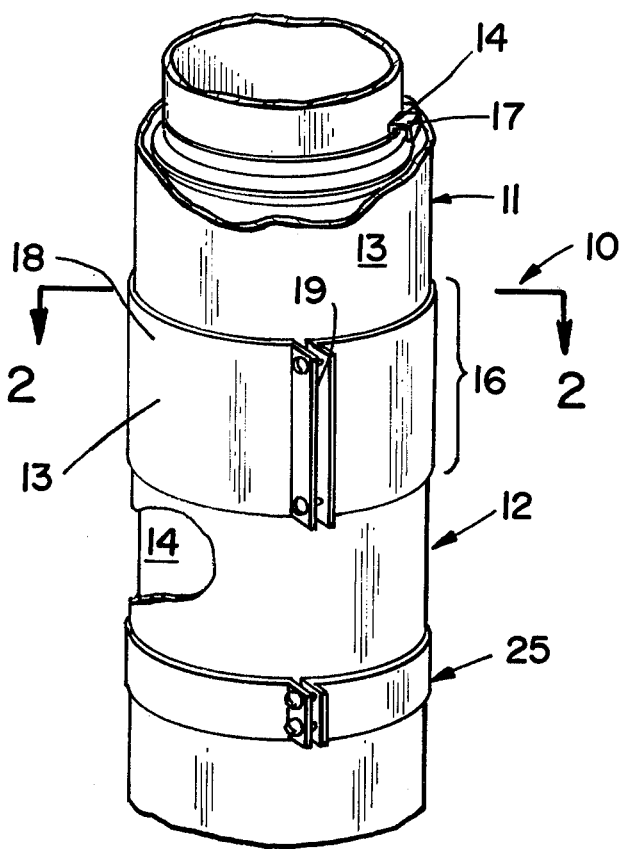
FIG_1
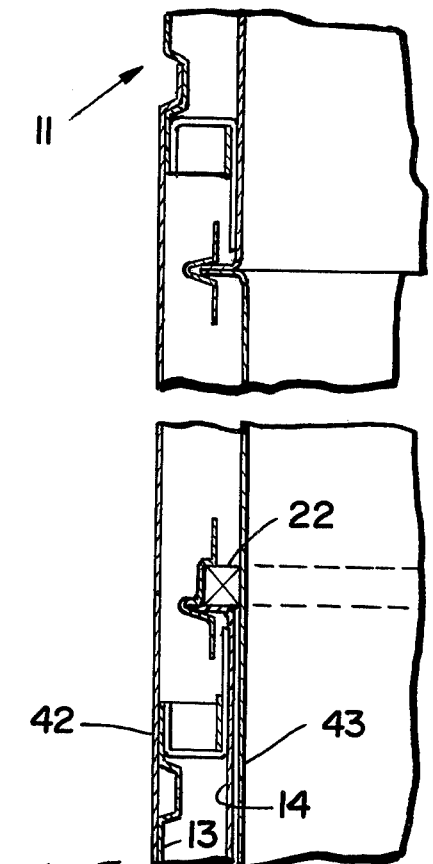
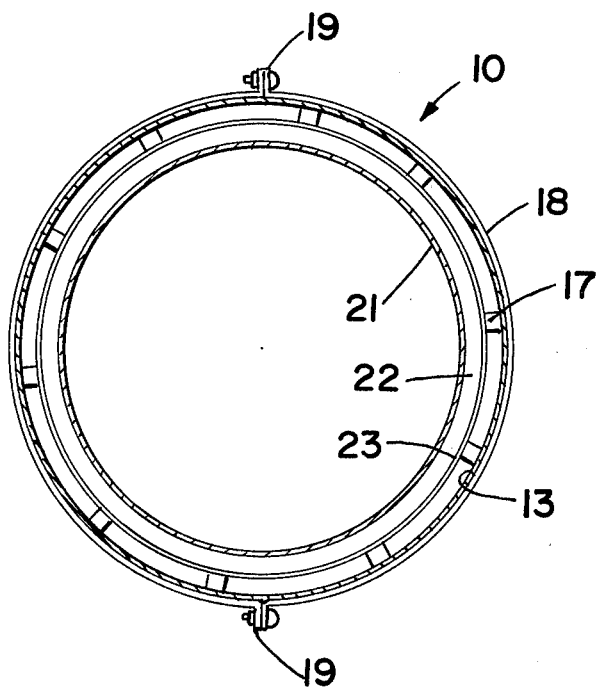
FIG_2
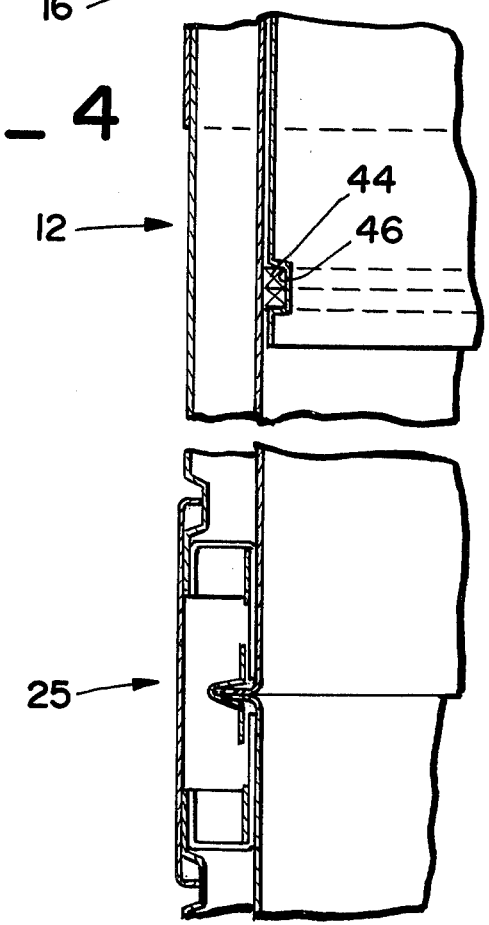
FIG_4

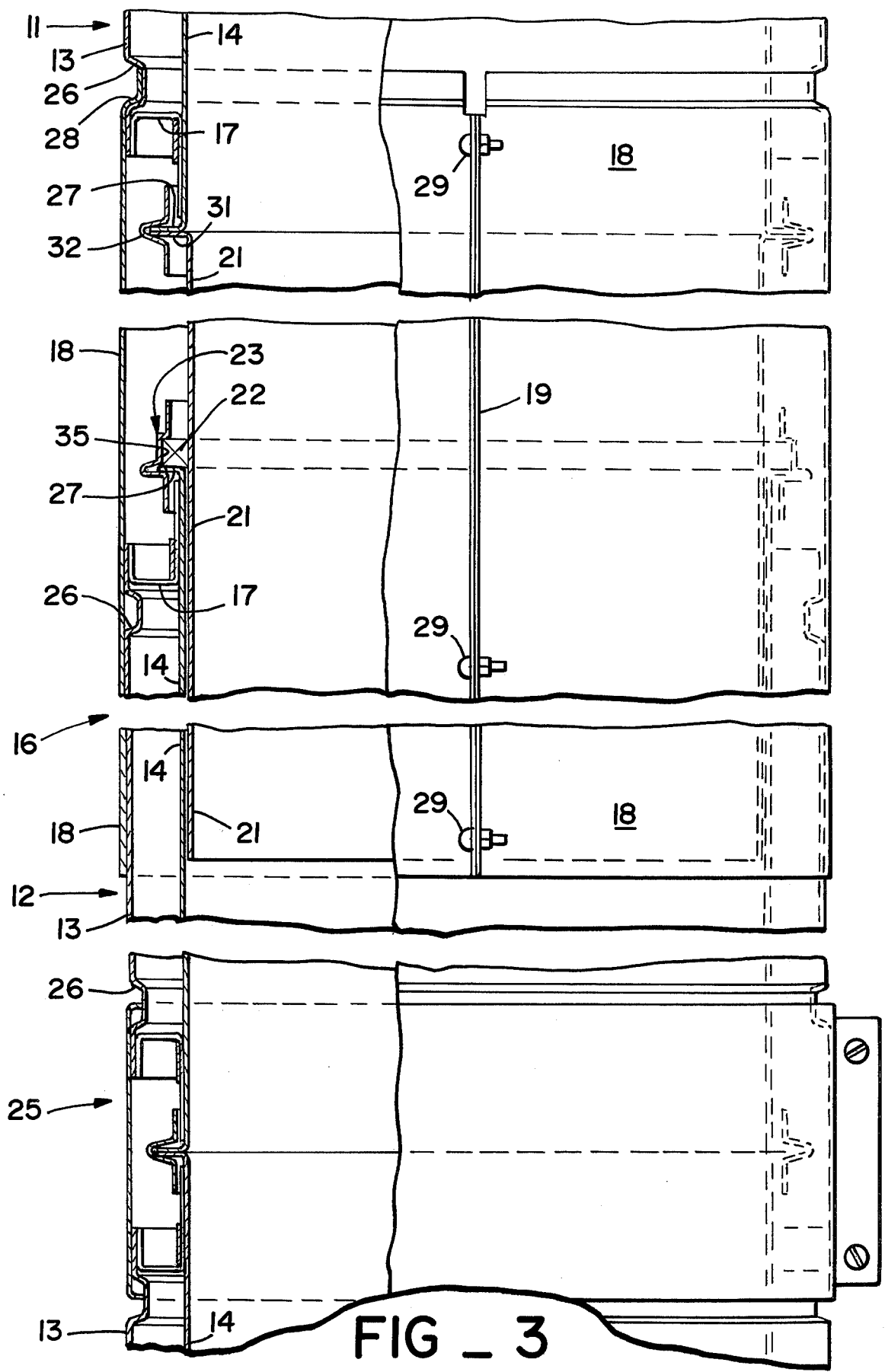
FIG_3

EXPANSION JOINT FOR PREFABRICATED DOUBLE-WALLED METAL CHIMNEY

BACKGROUND OF THE INVENTION

The invention relates to double-walled prefabricated metal chimneys, and more particularly to a slidable joint for such chimneys.

Double-walled prefabricated metal chimneys have previously been used, with some variation in form, as an easily assembled and installed means of conveying smoke and flue gases to the outside of a dwelling or other building. The central space defined by the inner chimney wall carries the smoke and gases, while the annular space between the inner and outer walls provides an insulating space so that the outer wall remains relatively cool, and the chimney may be placed inside the building walls without creating a fire hazard. Sometimes the annular space in the chimney is open to the atmosphere at its upper and lower ends, or to an air circulating system, so that further heat can be exhausted or conducted into a space to be heated.

A prefabricated double-walled metal chimney assembly is illustrated and described in my U.S. Pat. No. 3,902,744.

Previous double-walled chimney assemblies have employed several types of expansion joint for thermal expansion and contraction, including a bellows-type joint in the inner chimney wall. However, none has provided an efficient combination joint for handling such expansion and contraction as well as for facilitating length adjustment during installation, as does the present invention described below.

SUMMARY OF THE INVENTION

The present invention provides such an efficient combination joint for a prefabricated double-walled chimney, with a resilient gasket sealing the two overlapping and relatively slidable inner wall sections. The joint includes an inner slip section extending down from the upper chimney section's inner wall, serving as an extension thereof, and an outer support jacket clamped over and extending down from the upper chimney section's outer wall. The lower chimney extends into the annulus defined by these two depending walls, with the support jacket outside the lower outer wall and the slip section inside the lower inner wall, providing a continuous inner wall surface. A gasket is supported by the top of the lower inner wall and engages the slip section for slidable movement with respect thereto. According to a second embodiment of the invention, a second gasket may be provided between the slip section and the same inner wall, near the bottom of the slip section.

It is among the objects of the invention to provide an efficient, versatile double-walled chimney joint which is relatively inexpensive to manufacture and easy to install, and which serves as both a length adjustment joint and a thermal expansion joint. These and other objects, advantages and features of the invention will become apparent from the following description of two preferred embodiments, taken in conjunction with the appended drawings.

BRIEF DESCRIPTION OF THE DRAWINGS

In the drawings:

FIG. 1 is a perspective view of a length of prefabricated double-walled chimney including a joint according to the invention;

FIG. 2 is a sectional view taken along the line 2—2 of FIG. 1;

FIG. 3 is a partially broken-away elevational view of the chimney; and

FIG. 4 is a partial sectional elevational view of a chimney joint according to another embodiment of the invention.

DESCRIPTION OF THE PREFERRED EMBODIMENTS

In the drawings, FIG. 1 shows a section of a prefabricated double-walled metal chimney 10, each of its upper and lower sections 11 and 12 having an outer cylindrical wall 13 and an inner cylindrical wall 14. An expansion and length adjustment joint between the two sections of chimney 11 and 12, as it appears from the exterior, is generally identified by the reference number 16 in FIG. 1. A support jacket 18 of the expansion joint 16 includes a pair of flanged, bolted together seams 19, one of which is seen in FIG. 1. Spacers 17 may be used to maintain proper spacing between the inner and outer walls 14 and 13 at various locations throughout the length of the chimney 10.

Also seen in FIG. 1 is a joint 25 used to connect adjacent chimney sections at locations other than that of the expansion and length adjustment joint 16. The joint 25 forms subject matter of my copending application Ser. No. 725,951, filed on the same day as this application.

FIG. 2, showing the chimney expansion and length adjustment joint 16 in section, indicates the support jacket 18, which serves as an outer wall at this location, an inner slip section 21 of the joint, and a gasket 22 held against the outside of the slip section 21 by a vee band 23 which is connected to the inner chimney wall 14 below (not shown in FIG. 2). Also seen in FIG. 2 are portions of the spacers 17 and the upper edge of the outer wall 13 of the lower chimney section 12.

The elevation view of FIG. 3 shows the arrangement of components of the expansion and length adjustment joint 16. In the broken away portion of the figure, it is seen that each of the outer cylindrical walls 13 of the upper and lower chimney sections 11 and 12 includes a formed groove 26 just short of the point of termination, while each of the inner walls 14 of the two sections extends axially a short distance farther than the outer wall and terminates in a radially outwardly extending flange 27. At the bottom of the upper chimney section 11, a top angled flange 28 of the support jacket 18 seats within the outer wall groove 26. As indicated, the support jacket 18 may be assembled over the end of the upper section's outer wall 13 and over the outer wall 13 of the lower chimney section 12 with its flanged seams 19 open, after which it may be closed and tightened together with bolts 29 or other fasteners. At the ends of both chimney sections 11 and 12, a series of annularly spaced spacers 17, which may be U-shaped as shown, holds the outer and inner walls 13 and 14 in the proper spaced relationship. Just below the spacers 17, the projecting flange 27 of the upper section inner wall 14 is connected to a similar flange 31 of the slip section 21 by a vee band 32 which engages the two flanges in wedge-like fashion as shown. The vee band 32 extends around the circumference of the flanges and may be connected together at one or more juncture points (not shown) by suitable fasteners such as bolts, clips, etc. (not shown). The use and structure of these vee bands is discussed in my above-mentioned copending application. The slip section 21, which is a simple cylindrical sleeve except at the flange 31, is thus tightly retained to the upper section's inner wall 14, serving as a downward extension thereof.

As indicated in FIG. 3, the diameter of the slip section 21 is less than that of the inner walls 14, and in fact its outside diameter is slightly less than the inside diameter of the walls 14. The inner wall 14 of the lower chimney section 12 extends up and overlaps the slip section as shown, and the relative diameters create a small spacing between these members. The overlap between these members varies in length depending upon the installation and, to a small extent, on thermal expansion and contraction. At the top of the inner wall 14 is an outwardly extending flange 27 similar to the flange 27 above. The gasket supporting vee band 23 is attached to this flange as shown, with a recessed portion 35 retaining the gasket 22 against both the flange 27 and the surface of the slip section 21. The gasket 22 should be heat resistant, yet with good resilience and sealing properties. It may be, for example, a graphited woven asbestos, which also provides for efficient sliding movement.

Thus, the preferably square resilient gasket 22 is tightly retained against the flange 36 in sealed relationship, and is also retained circumferentially around the outside of the slip section 21, in a slidable sealing contact. This allows for adjustment of the relative positions of the two chimney sections 11 and 12 during installation and for later thermal expansion and contraction, while still preventing the escape of smoke and flue gases. The gasket 22 also provides a bearing area between the slip section 21 and the wall 14. The slip section 21 is the inner of the overlapping sleeves so that moisture within the chimney cannot fall between the two sleeves.

The support jacket 18, extending down from the upper chimney section's outer wall 13, closely overlaps the upwardly extending lower outer wall 13 and is slidable with respect to this wall. It is positioned outside the lower outer wall 13 so that exterior moisture cannot fall between the two overlapping cylinders. No gasket need be provided, since the inner gasket 22 seals all gases within the inner space of the chimney, the space between the inner and outer walls being an insulating space.

The formed grooves or corrugations 26 in the outer walls 13 add strength in the joint area, as well as providing for connection between adjacent chimney sections at all regular joints 25. The positioning of the spacers 17 at the ends of the outer walls 13, adjacent to the corrugations 26, and close to the ends of the inner walls 14 also strengthens the joint 16.

As can easily be seen from the above, the expansion and length adjustment joint 16 can serve as a means for joining two parts of a chimney when one section has been built up from below and the other has been built down from above. The joint is easily assembled on the job and avoids the need for any cutting of chimney sections.

FIG. 4 shows an alternative form of the invention wherein the expansion and length adjustment joint 16' is of greater length, with a longer support jacket 42 and slip section 43 which are capable of overlapping the walls of the lower chimney section 12 to a greater extent than in the previously described embodiment. This makes the joint 16' somewhat more versatile than the joint 16 in terms of length adjustability.

In this embodiment, wherein a much longer area of overlap occurs between the lower section inner wall 14 and the slip section 43, which are spaced apart, it is desirable to keep flue gases from entering this space and circulating therein. For this reason, an inner gasket 44 is provided in a formed recess 46 of the slip section 43 as shown, for slidable engagement with the inside surface of the inner wall 14. The gasket 44 may comprise two small square-cross-section annular gaskets arranged side-by-side, so that a rectangular gasket results, as illustrated in FIG. 4. This creates a double seal against the escape of flue gases, keeps the gases from between the spaced walls 14 and 43, and also has the effect of strengthening and stiffening the lower end of the slip section 43. This results not only from the presence of the gasket 44 and its maintaining of spacing between the walls 43 and 14 in this area, but also from the stiffening effect of the formed recess 46 in the slip section 43.

In both forms of the invention described, the slip section 21 or 43 is overlapped by the lower inner wall 14 to a greater extent than the support jacket 18 or 42 overlaps the lower outer wall 42. This can be important in installation of the chimney. If the upper and lower assemblies are inadvertently pulled apart during the installation, they may be easily reassembled by first inserting the slip section (21 or 43) inside the lower inner wall 14, then moving the two assemblies together until the support jacket (18 or 42) reaches the lower outer wall 13, whereupon these components may be guided together. If the outer wall components overlapped first, then the inner components would not be accessible for being guided together.

The above-described preferred embodiments provide a versatile length adjustment and expansion joint for prefabricated metal chimneys. The joint is inexpensively manufactured, relatively simple in construction and readily assembled at the job site without cutting of chimney sections. Various other embodiments and alterations to this preferred embodiment may be made without departing from the spirit and scope of the invention as defined in the following claims.

I claim:

1. An expansion and length adjustment joint for a prefabricated double-walled metal chimney having outer and inner cylindrical chimney walls, comprising:
   an upwardly extending end portion of the outer wall of a lower chimney section;
   an outer support jacket connected to and extending downwardly from the outer wall of an upper chimney section, overlapping the upwardly extending outer wall end portion for a first selected distance and being closely circumjacent the lower outer wall in the overlapped area and is axially slidable with respect to the latter wall;
   an inner slip section connected to and extending downwardly from the inner chimney wall of the upper chimney section;
   an upwardly extending end portion of the inner wall of the lower chimney section, overlapping the inner slip section for a second selected distance and lying just outside the slip section in the overlapped area;
   an annular gasket supported by and in sealed engagement with said lower inner wall end portion, and in slidable sealed engagement with the outer surface of the inner slip section; and means retaining the inner and outer walls of each of the upper and lower chimney sections a spaced distance apart near the joint.

2. The expansion and length adjustment joint of claim 1 wherein said second selected distance is greater than said first selected distance.

3. The expansion and length adjustment joint of claim 1 wherein said outer support jacket comprises a removable sleeve having at least one openable seam to facilitate assembly around the upwardly extending outer wall end portion, and further including means associated with the top of the support jacket and with the end of the upper chimney section's outer wall for forming a connection between said support jacket and upper outer wall when the support jacket is closed together at said seam.

4. The expansion and length adjustment joint of claim 1 wherein said retaining means comprises annularly spaced series of spacers connected between the upper chimney section's outer and inner walls near its lower end, and between the lower chimney section's outer and inner walls near its upper end.

5. The expansion and length adjustment joint of claim 1 wherein said lower chimney section's inner wall end portion includes a radially outwardly extending flange at the top of said end portion, and including annular clip means retaining the annular gasket against said radially outwardly extending flange and against the outer surface of the inner slip section.

6. The expansion and length adjustment joint of claim 1 which further includes a second annular gasket retained to and in sealed engagement with the slip section near its bottom, facing outwardly and in slidable engagement with the inside surface of the inner wall of the lower chimney section.

7. The expansion and length adjustment joint of claim 6 wherein the slip section includes an inwardly extending annular recess near its bottom end for retaining the second annular gasket.

* * * * *